J. FLINNER.
GATE.
APPLICATION FILED APR. 20, 1908.
913,717.
Patented Mar. 2, 1909.
2 SHEETS—SHEET 2.
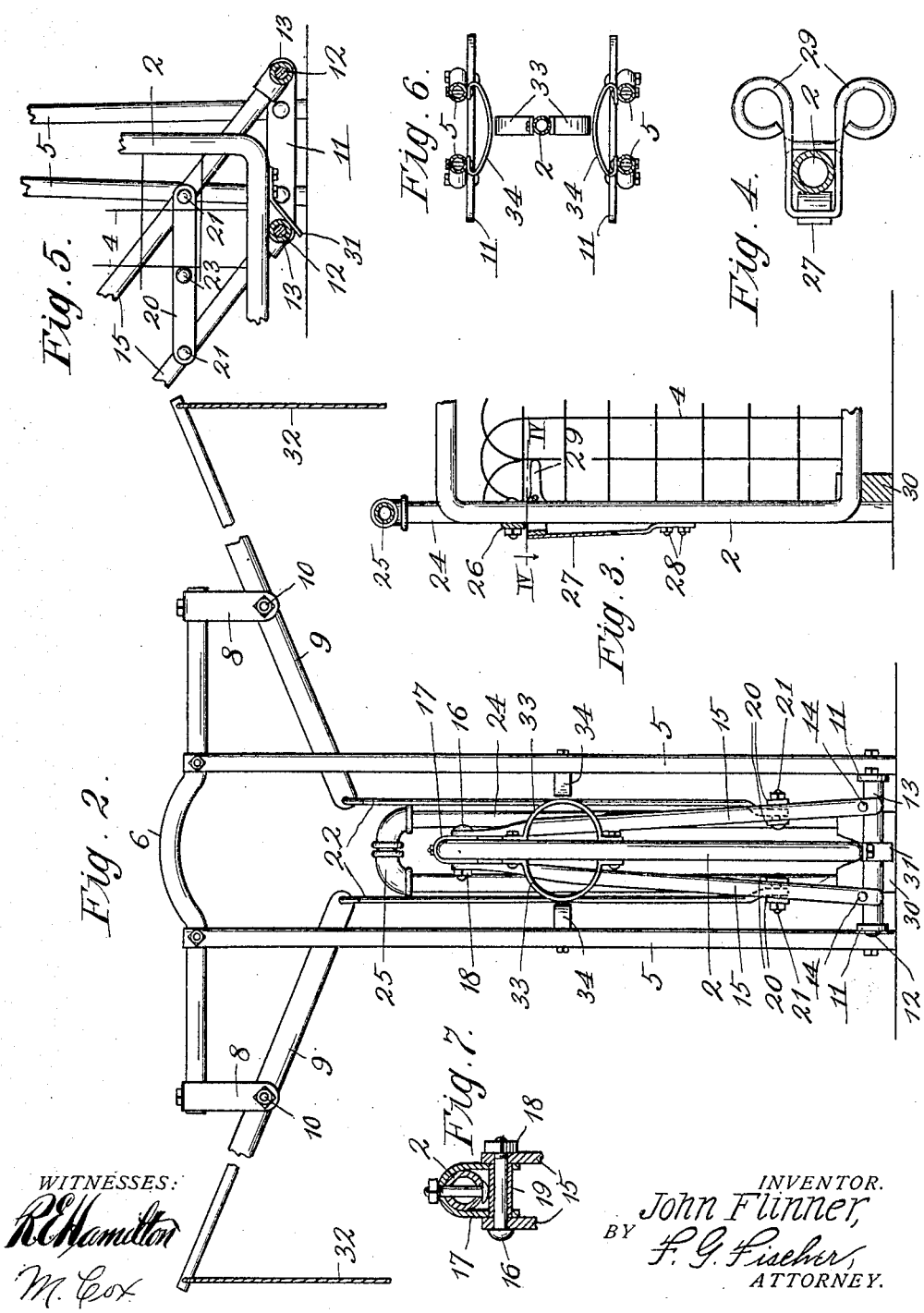
WITNESSES:
R. E. Hamilton
M. Cox
INVENTOR.
John Flinner,
BY F. G. Fischer,
ATTORNEY.

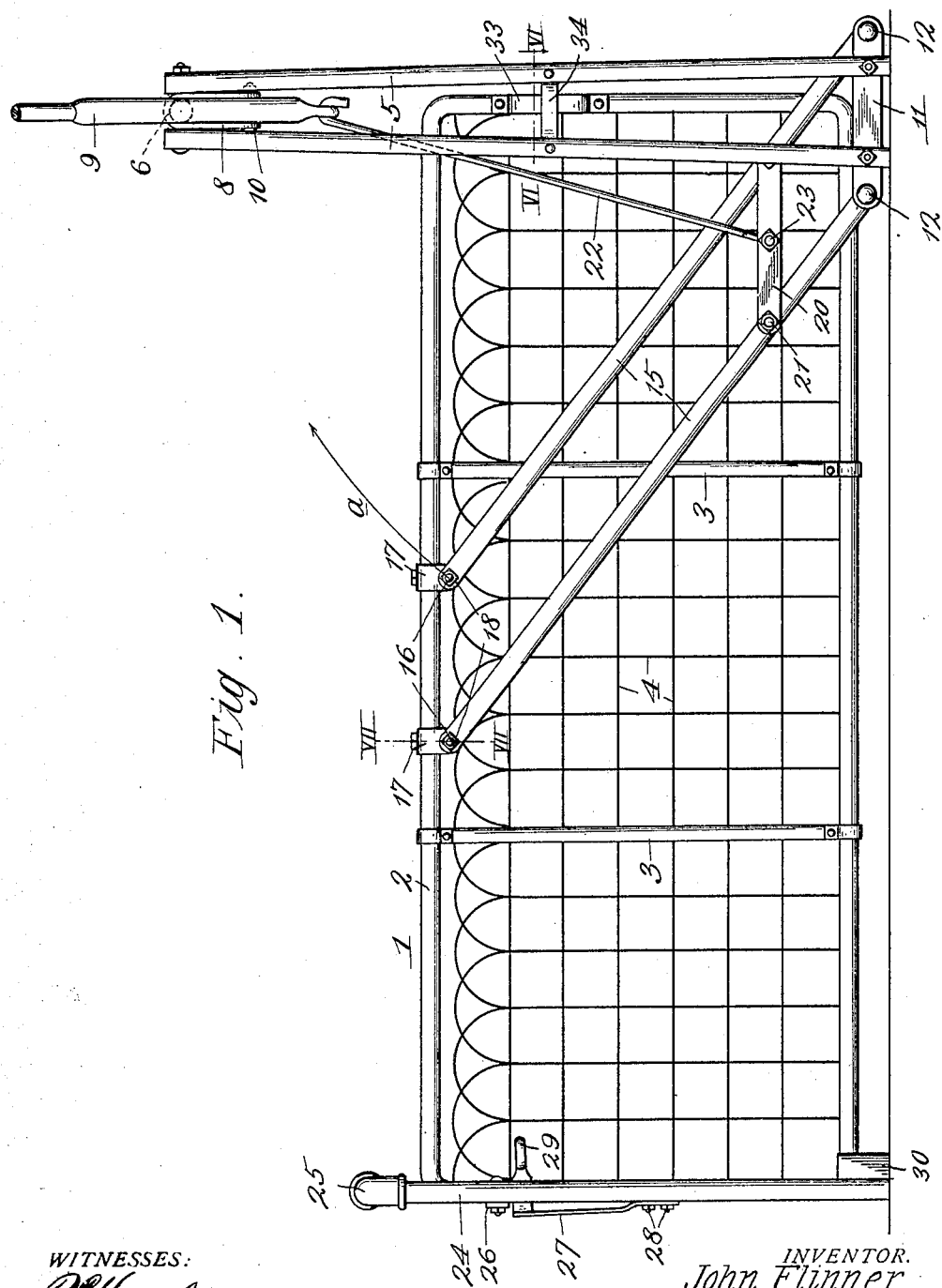

UNITED STATES PATENT OFFICE.

JOHN FLINNER, OF LEAVENWORTH, KANSAS.

GATE.

No. 913,717.      Specification of Letters Patent.      Patented March 2, 1909.

Application filed April 20, 1908. Serial No. 428,134.

*To all whom it may concern:*

Be it known that I, JOHN FLINNER, a citizen of the United States, residing at Leavenworth, in the county of Leavenworth and State of Kansas, have invented certain new and useful Improvements in Gates, of which the following is a specification.

This invention relates to that class of gates which may be opened and closed by a person sitting in a carriage without alighting therefrom.

One object of the invention is to provide a substantially constructed gate, so that it will not easily get out of order.

A further object is to provide means for preventing hogs or other animals from lifting the gate while attempting to pass beneath the same.

Referring now to the accompanying drawings, which illustrate the invention: Figure 1 is a side elevation of my improved gate. Fig. 2 is a rear elevation of the gate. Fig. 3 is a broken elevation of the front portion of the gate. Fig. 4 is a section of the front end of the gate on line IV—IV of Fig. 3. Fig. 5 is a broken detail view of the rear portion of the gate. Fig. 6 is a horizontal section on line VI—VI of Fig. 1. Fig. 7 is a vertical section on line VII—VII of Fig. 1.

1 designates the gate which consists of a tubular rectangular frame 2, vertical braces 3 for reinforcing said frame, and a wire-netting 4 covering the frame. Wooden slats may be substituted for the netting when desired.

5 designates two pairs of supporting-posts arranged at opposite sides of the rear end of the gate and united at their upper ends by a yoke 6 provided at its ends with depending clevises 8, between the lower ends of which two operating-levers 9 are mounted upon bolts 10 extending through the clevises. The lower ends of posts 5 are united in pairs by two bars 11 carrying at their ends a pair of axles 12 upon which are mounted a pair of hubs 13.

15 designates two pairs of oscillatory-levers fixed at their lower ends to hubs 13 by bolts 14 and pivotally secured at their upper ends by two bolts 16, to a pair of clips 17 fixed to the upper middle portion of the gate. Bolts 16 are held in position by retaining-nuts 18 and in order to prevent said nuts from forcing the upper ends of the oscillatory-levers 15 into frictional contact with the adjacent sides of clips 17, I provide bolts 16 with spacing-sleeves 19 which extend through the clips and abut against the levers, as shown in Fig. 7. The oscillatory-levers 15 diverge at their lower ends as shown in Fig. 2, to prevent the gate from being swayed laterally by the wind while it is being opened or closed. Said levers are also connected at their lower portions in pairs by two pairs of equalizing-bars 20 which are pivotally secured thereto by bolts 21 to equalize the strain on the levers when opening or closing the gate.

22 designates a pair of lifting-rods connected at their upper ends to the adjacent ends of the operating-levers 9 and pivotally connected at their lower ends to bolts 23 extending through the central portions of links 20.

24 designates a pair of latch-posts between which the front end of the gate extends when in a closed position, as shown in Figs. 1 and 3. Said posts are united at their upper ends by an arch 25. They are also connected at their upper portions by a transverse keeper 26 which coöperates with a yielding latch 27 in preventing hogs, or other animals, from lifting the forward end of the gate in a direct vertical line while endeavoring to pass beneath the same. Latch 27 is secured to the front end of the gate by bolts 28, and is provided with two rearwardly-extending handles 29 whereby the gate may be readily opened by a person passing in either direction by drawing the latch 27 rearwardly from beneath the keeper 26. Latch 27 also acts as a buffer in gradually bringing the gate to a stop by contacting with the keeper 26 before it passes down beneath the same and permits the gate to strike said keeper.

When closed the front end of the gate is supported by a block 30, the upper end of which is forked so that the lower front end of the gate may pass through the same while being closed. The forked end of the block also engages the opposite sides of the front end of the gate and thus prevents the same from being swayed laterally by the wind. The rear end of the gate rests upon the foremost hub 13 and is provided with a downwardly-inclined catch 31 which engages the underside of said hub so that the rear end of the gate cannot be lifted in a direct vertical line by an animal, in an attempt to pass beneath the same. Catch 31 also limits the forward movement of the gate by contacting with the foremost hub.

32 designates two ropes depending from the ends of levers 9, within easy reach of a person sitting in a carriage.

The rear end of the gate is prevented from swaying laterally by a pair of bow-members 33 secured on opposite sides thereof, and a pair of bow-members 34 registering therewith and secured to the adjacent supporting posts 5, as shown in Figs. 1, 2, and 6.

The gate may be opened or closed by pulling downward on either of the ropes 32. If this operation is performed when the gate is closed it will, through the instrumentality of the operating-lever to which the cable is attached, the lifting-rods 22, and the oscillatory-levers 15, be lifted backward and upward in the direction of arrow $a$. When levers 15 attain a vertical position they will have a tendency to stop and hold the gate half-way open, but the momentum acquired by the latter will carry the levers backward to an inclined position, after which the weight of the gate is sufficient to complete its opening movement. The gate may then be restored to its closed position by pulling downward on either of the cables 32.

Having thus described my invention, what I claim is:—

In combination, a gate arranged to swing to and fro, supporting posts at opposite sides of said gate, bow-members on said supporting posts, and bow-members on the rear end of the gate which register with the members on the posts when the gate is in a closed position.

In testimony whereof I affix my signature, in the presence of two witnesses.

JOHN FLINNER.

Witnesses:
 F. G. FISCHER,
 M. COX.